Figure 1:
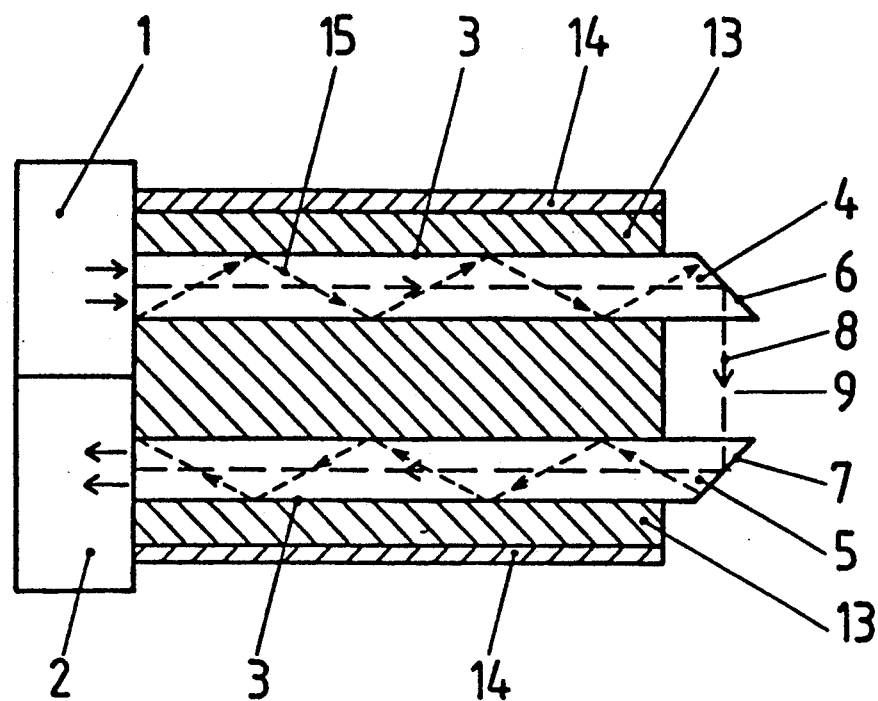

United States Patent [19]

Keita

[11] Patent Number: 5,020,380

[45] Date of Patent: Jun. 4, 1991

[54] MASS FLOW OPERATING BY THE CORIOLIS PRINCIPLE

[75] Inventor: Mamadi Keita, Basel, Switzerland

[73] Assignee: Flowtec AG, Reinach, Switzerland

[21] Appl. No.: 457,814

[22] PCT Filed: May 10, 1989

[86] PCT No.: PCT/EP89/00517

§ 371 Date: Jan. 8, 1990

§ 102(e) Date: Jan. 8, 1990

[87] PCT Pub. No.: WO89/11084

PCT Pub. Date: Nov. 16, 1989

[30] Foreign Application Priority Data

May 11, 1988 [DE] Fed. Rep. of Germany .... 3816045.5

[51] Int. Cl.$^5$ ............................................. G01F 1/84
[52] U.S. Cl. ............................................. 73/861.37
[58] Field of Search ................... 73/861.37, 861.38; 350/96.2

[56] References Cited

U.S. PATENT DOCUMENTS

| | | | |
|---|---|---|---|
| 3,912,362 | 10/1975 | Hudson | 350/96.2 |
| 4,173,393 | 11/1979 | Maurer | |
| 4,778,243 | 10/1988 | Finzel | 350/96.2 |
| 4,801,897 | 1/1989 | Flecken | 73/861.38 |
| 4,828,276 | 5/1989 | Abbott | 350/96.2 |
| 4,863,234 | 9/1989 | Gladenbecit | 350/96.2 |

FOREIGN PATENT DOCUMENTS

| | | |
|---|---|---|
| 0262573 | 4/1988 | European Pat. Off. . |
| 58-38904 | 3/1983 | Japan . |
| 58-61408 | 4/1983 | Japan . |
| 60-67805 | 4/1985 | Japan . |

Primary Examiner—Herbert Goldstein
Attorney, Agent, or Firm—Barnes & Thornburg

[57] ABSTRACT

The mass flow meter operating by the Coriolis principle comprises a mechanical oscillating system having at least one measuring tube and an optical sensor means for sensing the mechanical oscillations of the oscillating system. The optical sensor means includes a light transmitter, a light receiver and an optical waveguide means having two quartz or sapphire rods which transmit the light of the light transmitter to the light receiver, the transmitted light flux being influenced by the oscillations of the mechanical oscillating system. To increase the mechanical strength and to protect the quartz or sapphire rods against temperature influences and against chemically aggressive media, the quartz or sapphire rods are embedded in ceramic material or glass which, preferably, is further surrounded by a metal cladding.

10 Claims, 2 Drawing Sheets

MASS FLOW OPERATING BY THE CORIOLIS PRINCIPLE

The invention relates to a mass flow meter operating by the Coriolis principle comprising a mechanical oscillating system and an optical sensor means which detects the mechanical oscillations of the oscillating system and which has a light transmitter and a light receiver, the light of the light transmitter being transmitted to the light receiver by an optical waveguide means which comprises at least one quartz or sapphire rod and the light flux of which can be influenced by the oscillations.

In a mass flow meter of this type known from the published European patent application 0 262 573 the optical waveguide means consists of two sapphire rods, one of which is connected at one end to the light transmitter and the other of which is connected at one end to the light receiver. The other ends of the two sapphire rods are formed as total-reflecting prisms and spaced apart from each other in such a manner that the light flux emanating from the light transmitter and passing through the sapphire rod enters the other sapphire rod and is conducted by the latter to the light receiver. On the measuring tubes of the mass flow meter immersion tabs are mounted in such a manner that in dependence upon the deflections of the measuring tubes they project to a greater or lesser extent into the gap formed between the prismatically shaped ends of the sapphire rods. The advantage achieved with this arrangement is that the light transmitter and the light receiver can be accommodated in a protected manner at a distance from the oscillating measuring tube system, so that they are not exposed to pronounced temperature fluctuations when alternately cold and hot fluid flows through the measuring tubes. It is, moreover, avoided that the measuring tube system set in mechanical oscillations transmits undesired vibrations to the light transmitter and the light receiver or that the latter are attacked by a chemically aggressive fluid which may emerge from the measuring tubes. However, the sensitive sapphire rods of the optical waveguide means are exposed to such thermal, chemical and mechanical influences.

U.S. Pat. No. 4,173,393 describes an optical waveguide comprising a core of quartz, a cladding of glass and a protective coating of metallic glass. The protective coating of metallic glass is applied as a liquid which contracts more than the glass of the cladding when it solidifies, thereby placing the waveguide under constant compression which increases the resistance to fracture.

It is the problem underlying the invention to provide a mass flow meter operating by the Coriolis principle the optical waveguide means of which is distinguished by mechanical stability and resistance to corrosion and temperature.

According to the invention this problem is solved in that the or each quartz or sapphire rod of the optical waveguide means is surrounded by ceramic material or glass.

The ceramic material or glass surrounding the rods of the optical waveguide means improves the mechanical strength of the optical waveguide means and protects the quartz or sapphire rods of the optical waveguide means against chemical and thermal influences. The optical properties of the optical waveguide means are not affected by the embedding in ceramic material or glass, as ceramics or glass have a lower refractive index than quartz or sapphire. Particularly advantageous is the use of glass types suitable for industrial purposes, which glass types are suitable for bonding to sapphire and are chemically and thermally robust. Their refractive index is about 1.5 and is thus lower than that of sapphire.

An advantageous further development of the invention resides in the fact that the outside of the ceramic material or the glass is surrounded by a metal cladding. The chemical resistance and mechanical strength of the optical waveguide means is thereby further increased. The metal cladding also has the advantage that the optical waveguide means can now easily be secured to metallic objects, for example a metallic carrier housing.

Figure 2:
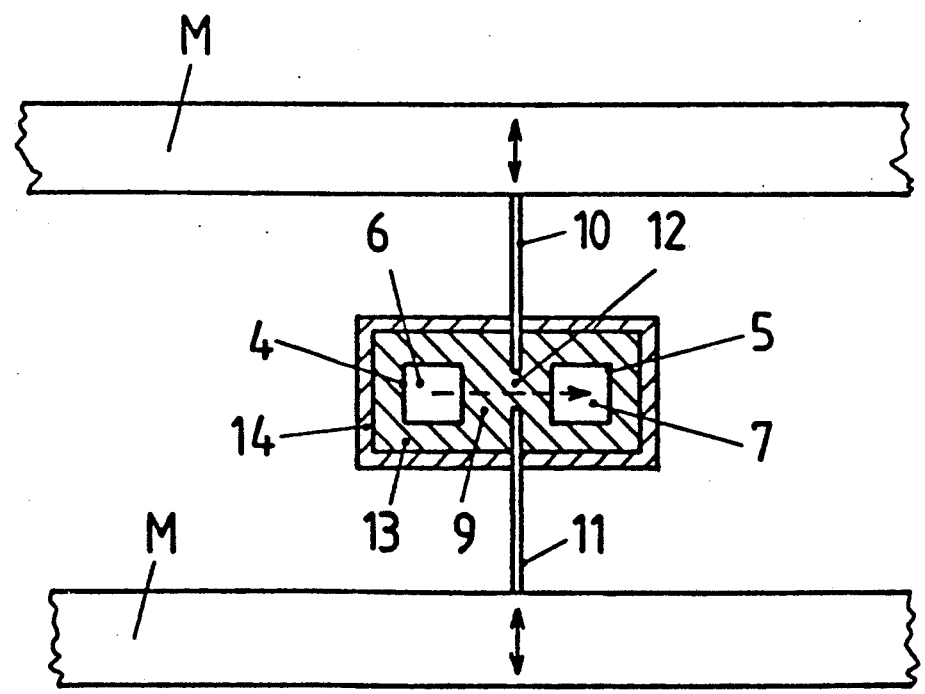
Figure 3:
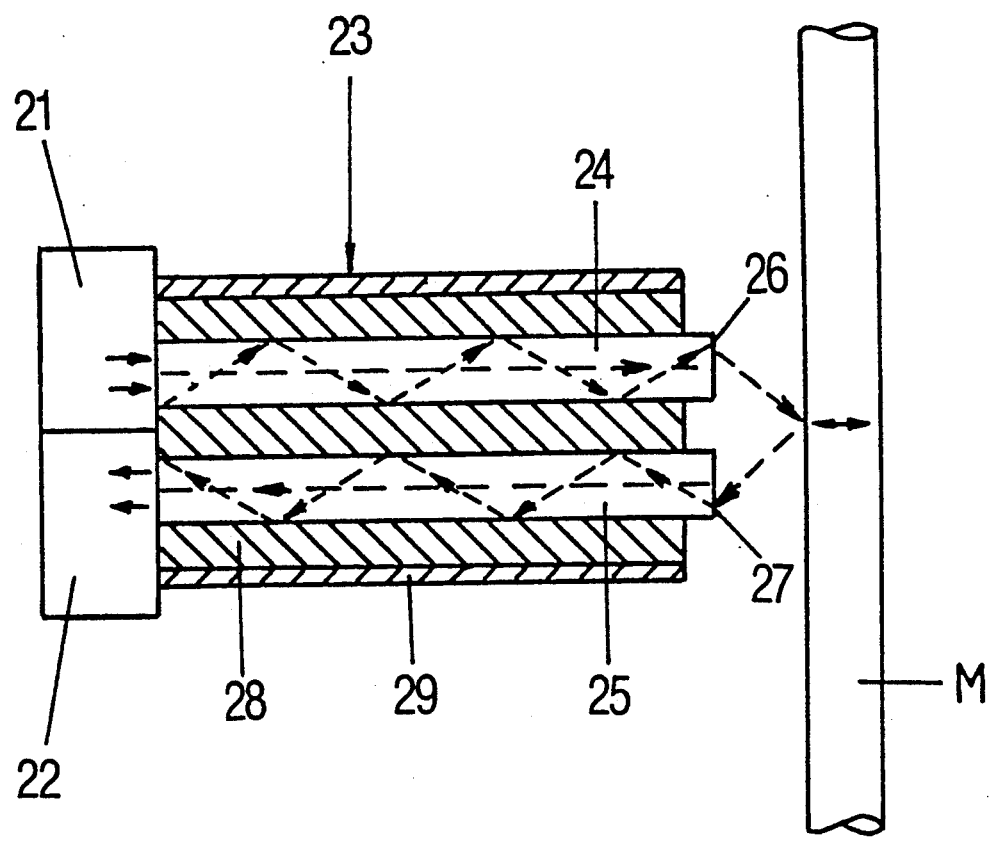

Hereinafter, an example of embodiment of the invention will be explained with the aid of the drawings, wherein:

FIG. 1 is a schematic illustration of an optical waveguide means designed according to the invention, FIG. 2 shows the installation of the optical waveguide means of FIG. 1 in a mass flow meter operating by the Coriolis principle, and FIG. 3 shows another embodiment of the optical waveguide means and its installation in a mass flow meter operating by the Coriolis principle.

Identical parts are provided in FIGS. 1 and 2 with identical reference numerals.

In accordance with FIG. 1, a light transmitter 1, a light receiver 2, and an optical waveguide means 3 which transmits the light of the light transmitter 1 to the light receiver 2 are provided. As will be explained by means of FIG. 2, the transmitted light flux is influenced by mechanical oscillations of the flow means of a Coriolis force mass flow meter.

As light transmitter 1 a light-emitting diode may be employed. The light receiver 2 is a photoelectric transducer which converts the received light to an electrical signal which represents a sensor signal. For example, for this purpose a PIN diode can be used in the infrared range (e.g. at a wavelength of 880 nm). The optical waveguide means 3 is formed by two sapphire rods 4 and 5 arranged at a slight distance apart from each other and parallel to each other. Said rods are connected at one end to the light transmitter 1 and the light receiver 2, respectively, whilst their other free ends are bevelled at an angle of 45 degrees so that the inclined end faces 6 and 7 formed thereby are at a right-angle to each other. The beam path thus formed of the light flux emitted by the light transmitter 1 is indicated in FIG. 1 by the dashed line 8. In the sapphire rod 4, the light is propagated substantially axially until it strikes the inclined end face 6 where it is totally reflected at an angle of 90 degrees. It passes through the air gap 9 disposed between the two sapphire rods 4 and 5 and strikes the inclined end face 7 of the sapphire rod 5 where it is again totally reflected at an angle of 90 degrees. It is thus propagated substantially axially in the sapphire rod 5 and strikes the light receiver 2. The two inclined end faces 6 and 7 thus together deflect the light through 180 degrees in the manner of a right-angled prism.

According to FIG. 1, the sapphire rods 4, 5 are embedded in a ceramic or glass body 13 which is illustrated in section (hatched) in the drawings. As is apparent from FIG. 2 in particular, the cross-sectional area of the ceramic or glass body 13 is substantially greater than the cross-sectional areas of the sapphire rods 4 and 5 embedded therein. The ceramic or glass body 13 serves to increase the strength of the optical waveguide means.

To further increase the strength, the ceramic or glass body 13 is surrounded by a metal cladding 14. Since the ceramic or glass body 13 has a lower refractive index than the sapphire rods 4, 5, the losses of light energy in the light transmission in the sapphire rods 4, 5 are minimized. For light rays which do not extend exactly axially within the rods are substantially totally reflected at the interface of sapphire to ceramic or glass due to said ratio of the refractive indices. This process is indicated in FIG. 1 by means of the dashed line 15. The metal cladding 14 can be applied to the outer surface of the ceramic or glass body 13 as a metal layer; however, preferably it is a prefabricated metal sleeve which is filled up with the ceramic material or glass 13 in which the sapphire rods 4 and 5 are embedded.

According to FIG. 2, the arrangement of FIG. 1 is installed as a displacement sensor in a Coriolis force mass flow meter having two parallel measuring tubes M in such a manner that the sapphire rods 4, 5 extend perpendicularly to the longitudinal axes of the measuring tubes M. Their inclined end faces 6, 7 lie between the measuring tubes M. An immersion tab 10, 11 is mounted on each measuring tube M perpendicularly to the measuring tube longitudinal axis in such a manner that said tab projects into the air gap 9 between the sapphire rods 4, 5. The two immersion tabs 10, 11 lie in a common plane and their facing edges are spaced from each other so that a gap 12 is formed therebetween through which part of the light flux reflected at the end face 6 can pass from the sapphire rod 4 to the sapphire rod 5. If in accordance with the mass flow measurement by the Coriolis principle the two measuring tubes M are set into opposing oscillations, the gap 12 between the immersion tabs 10, 11 becomes alternately wider and narrower in time with the oscillations. As a result, the light flux passing from the sapphire rod 4 to the sapphire rod 5 is modulated in its intensity. Accordingly, the amplitude and the phase of the modulated light flux and thus also the amplitude and the phase of the sensor signal furnished by the light receiver 2 correspond to the amplitude and the phase of the oscillations of the measuring tubes M.

In some cases it may be difficult to mount immersion tabs of the type of the immersion tabs 10 and 11 of FIG. 2 on the measuring tubes of the mass flow meter. FIG. 3 shows a modified embodiment of the optical waveguide means which is suitable for this case.

The optical waveguide means 23 of FIG. 3 again comprises two sapphire rods 24 and 25 which are connected at one end to a light transmitter 21 and a light receiver 22, respectively. The other ends of the sapphire rods 24 and 25 are not bevelled in this case but provided with plane end faces 26 and 27, respectively, which are perpendicular to the longitudinal axis and light-permeable. The optical wave-guide means 23 is mounted in such a manner that the end faces 26 and 27 lie opposite a measuring tube M at a slight distance. The measuring tube M comprises at least in the region lying opposite the end faces 26 and 27 a reflecting outer surface.

As in the embodiment of FIG. 1, the sapphire rods 24 and 25 are embedded in a ceramic or glass body 28 which in turn is surrounded by a metal cladding 29, and as a result the advantageous effects as described above are achieved. In the embodiment of FIG. 3, the light emitted by the light transmitter 21, which is propagated through the sapphire rod 24, emerges from the end face 26 so that it strikes the reflecting outer surface of the measuring tube M.

Part of the light reflected by the measuring tube M strikes the end face 27 of the sapphire rod 25, in which it is propagated to the light receiver 22. The intensity of the reflected light entering the sapphire rod 25 is dependent on the distance between the end faces 26, 27 and the measuring tube M. If, as indicated by the double arrow in FIG. 3, the measuring tube M is set into oscillations, this distance will change in time with the oscillations so that the intensity of the light which is transmitted by the sapphire rod 24 after reflection at the measuring tube M into the sapphire rod 25 is modulated in accordance with the oscillations. Thus, the light receiver 22 supplies, similar to the light receiver 2 of FIG. 1, an oscillation sensor signal modulated in time with the oscillations.

To ensure that the greatest possible part of the light emerging from the sapphire rod 24 enters the sapphire rod 25 after reflection at the measuring tube, it is favourable to keep the distance between the sapphire rods 24 and 25 small. Therefore, in FIG. 3 the sapphire rods 24 and 25 lie closer together than the sapphire rods 4 and 5 in FIG. 1.

Both in the embodiment of FIG. 1 and 2 and in the embodiment of FIG. 3, quartz rods may be used as well instead of the sapphire rods.

Moreover, it is not necessary that the ceramic or glass body and the metallic cladding surrounding it have a rectangular cross-sectional profile, as illustrated in FIG. 2. The cross-sectional profile of these parts is optional and can in particular also be circular.

I claim:

1. A Coriolis type mass flow meter comprising a mechanical oscillating system and optical sensor means for detecting mechanical oscillations of the oscillating system, said optical sensor means comprising a light transmitter, a light receiver, and optical waveguide means for transmitting light from said light transmitter to said light receiver so that the transmitted light flux is influenced by the mechanical oscillations, said optical wave guide means comprising at least one quartz or sapphire rod wherein each quartz or sapphire rod is surrounded by a ceramic material or glass and the outside of said ceramic material or glass is surrounded by a metal cladding.

2. The Coriolis type mass flow meter according to claim 1 wherein said metal cladding is applied as a layer to the outside of said ceramic material or glass.

3. The Coriolis type mass flow meter according to claim 1 wherein said metal cladding is a metal sleeve which is filled with said ceramic material or glass surrounding said quartz or sapphire rods.

4. The Coriolis type mass flow meter according to claim 1 wherein said optical waveguide means comprises first and second sapphire rods, the first rod being coupled at a first end to said light transmitter and the second rod being coupled at a first end to said light receiver, the second ends of the first and second sapphire rods being formed as total reflecting prisms which lie spaced apart opposite each other in such a manner that the light flux passing from the light transmitter through the first sapphire rod enters the second sapphire rod and is conducted by the second sapphire rod to said light receiver, and wherein at least one immersion tab is attached on said mechanical oscillating system in such a manner that in dependence upon the deflection of said oscillating system it projects to a greater or lesser extent into a gap existing between the second ends of the first and second sapphire rods.

5. The Coriolis type mass flow meter according to claim 1 wherein said mechanical oscillating system comprises a measuring tube which is traversed by the flow to be measured and set in mechanical oscillations and wherein said optical waveguide means comprises first and second sapphire rods, the first rod being coupled at a first end to said light transmitter and the second rod being coupled at a first end to said light receiver, the second ends of said first and second sapphire rods being light permeable and lying opposite to and spaced from said measuring tube, said measuring tube having a light reflecting surface at last in the region opposite the second ends of said sapphire rods so that the light passing from said light transmitter through said first sapphire rod is at least partially reflected by said measuring tube and thereby enters said second sapphire rod by which it is conducted to said light receiver.

6. A Coriolis type mass flow meter comprising a mechanical oscillating system and optical sensor means for detecting mechanical oscillations of the oscillating system, said optical sensor means comprising a light transmitter, a light receiver, and optical waveguide means for transmitting light from said light transmitter to said light receiver so that the transmitted light flux is influenced by the mechanical oscillations, said optical wave guide means comprising a plurality of quartz or sapphire rods which are embedded in a ceramic or glass body surrounded by a metal cladding.

7. The Coriolis type mass flow meter according to claim 6 wherein said metal cladding is applied as a layer to the outside of said ceramic material or glass.

8. The Coriolis type mass flow meter according to claim 6 wherein said metal cladding is a metal sleeve which is filled with said ceramic material or glass surrounding said quartz or sapphire rods.

9. The Coriolis type mass flow meter according to claim 6 wherein said optical waveguide means comprises first and second sapphire rods, the first rod being coupled at a first end to said light transmitter and the second rod being coupled at a first end to said light receiver, the second ends of the first and second sapphire rods being formed as total reflecting prisms which lie spaced apart opposite each other in such a manner that the light flux passing from the light transmitter through the first sapphire rod enters the second sapphire rod and is conducted by the second sapphire rod to said light receiver, and wherein at least one immersion tab is attached on said mechanical oscillating system in such a manner that in dependence upon the deflection of said oscillating system it projects to a greater or lesser extent into a gap existing between the second ends of the first and second sapphire rods.

10. The Coriolis type mass flow meter according to claim 6 wherein said mechanical oscillating system comprises a measuring tube which is traversed by the flow to be measured and set in mechanical oscillations and wherein said optical waveguide means comprises first and second sapphire rods, the first rod being coupled at a first end to said light transmitter and the second rod being coupled at a first end to said light receiver, the second ends of said first and second sapphire rods being light permeable and lying opposite to and spaced from said measuring tube, said measuring tube having a light reflecting surface at least in the region opposite the second ends of said sapphire rods so that the light passing from said light transmitter through said first sapphire rod is at least partially reflected by said measuring tube and thereby enters said second sapphire rod by which it is conducted to said light receiver.

* * * * *